United States Patent [19]
Gaffar et al.

[11] 3,879,545
[45] Apr. 22, 1975

[54] VACCINES FOR THE PREVENTION OF DENTAL CARIES

[76] Inventors: Abdul Gaffar, 30 Macafee Rd., Somerset, N.J. 08873; Richard Charles Kestenbaum, 18 Bradford Rd., Old Bridge, N.J. 08857

[22] Filed: May 16, 1973

[21] Appl. No.: 360,964

Related U.S. Application Data

[63] Continuation-in-part of Ser. No. 126,933, April 22, 1971, abandoned.

[52] U.S. Cl. ................................................. 424/92
[51] Int. Cl. ............................................. C12k 5/00
[58] Field of Search ........................................ 424/92

[56] References Cited
UNITED STATES PATENTS
2,944,941  7/1960  Goldenberg ......................... 424/50

OTHER PUBLICATIONS
Dental Abstracts, Vol. 13, page 401, 1968.
Dissertation Abstracts, Vol. 27, page 525B, 1966.
Gibbons et al., Archs. Oral Biol., Vol. 13, pages 297–308, 1968.

*Primary Examiner*—Richard L. Huff
*Attorney, Agent, or Firm*—Robert L. Stone; Murray M. Grill; Herbert S. Silvester

[57] ABSTRACT

Vaccines are prepared from a levan-producing strain of Streptococcus, especially Streptococcus Strain SS2, in the prevention, via immunization, of dental caries. The levan may be used in pure form or may be used in the form of the crude extracellular polysaccharide thereof to produce the vaccine material. Killed Streptococcus SS2 cells containing the extracellular polysaccharide may also be used in lieu of either the pure levan or the polysaccharide material.

9 Claims, No Drawings

VACCINES FOR THE PREVENTION OF DENTAL CARIES

REFERENCE TO RELATED APPLICATION

This is a continuation-in-part of application Ser. No. 126,933, filed Mar. 22, 1971, now abandoned.

BACKGROUND OF THE INVENTION

This invention relates to the prevention of dental caries and to compositions useful therein. More particularly, it relates to the provision of a vaccine useful in immunization against dental caries, to methods of producing the vaccine and to immunization methods utilizing the same. Specifically, it relates to the formation of a vaccine from the cariogenic microorganism Streptococcus SS2, and to the use thereof in caries immunization.

It has been observed during the past decade or so that the formation of carious lesions in teeth is the result of interaction between carbohydrates, notably sucrose, and bacteria on the tooth surfaces. A variety of specific organisms have been described as etiologic agents of dental caries, notable among which are bacteria of the genus Streptococcus. Various Streptococci have been isolated from the oral cavity and have been linked to the formation of dental caries in experimental animals.

In the course of experimentation in this field, several attempts have been made to provide an immunological technique effective against the formation of dental caries. For example, in 1966 M. Wagner reported that when germ-free rats were brought into gnotobiotic monoassociation with *Streptococcus faecalis* they developed active carious lesions, but that the formation of caries was virtually eliminated in littermated rats which were simultaneously immunized with the homologous organism. See Dental Abstracts, Vol. 13, page 401, 1968 and Dissertation Abstracts, Vol. 27, page 525B, 1966. Subsequently, however, it has been shown that *S. faecalis* is, in fact, non-cariogenic. Thus, R. J. Fitzgerald ("Dental Caries Research in Gnotobiotic Animals," Caries Research 2, page 139-146 [1968] ) has shown that S. faecalis is inactive in gnotobiotic rats fed high sucrose diets (see Table III thereof). Similarly, in 1971 Bleiweis, et al., (A. S. Bleiweis, R. A. Craig, S. E. Coleman, and I. Van DeRijn, Journal of Dental Research, Supplement to No. 5, Vol. 50, pages 1,118-1,130 [1971] ) reported (Table 6) that *S. faecalis* was non-cariogenic.

Similarly, in 1960 W. H. Bowen reported, J. Br. Dent. Res., Vol. 126, pp. 159-160, on the use of a dextran-producing cariogenic organism in the form of whole viable cells to immunize monkeys against dental caries. The organism employed was a strain of *Streptococcus mutans*, one of two bacteria widely regarded as being causative agents in the formation of dental caries. Subsequently, however, it has been reported that *S. mutans* strains are inactive in vaccines for the prevention of caries. See R. J. Fitzgerald and P. H. Keyes, "Attempted Immunization of Albino Hamsters Against Induced Dental Caries," 40th General Meeting of International Association of Dental Research, Published Abstract No. 146 (1962); B. Guggenheim, H. R. Muhlemann, B. Regolatti, and R. Schmid, "The Effect of Immunization Against Streptococci for Glucosyl-Transferases on Plaque Formation and Dental Caries in Rats," Symposium, University of Dundee, 1969, E. S. Livingston, London; and J. M. Tanzer, G. J. Hageage, Jr., and R. H. Larson, "Inability to Immunologically Protect Rats Against Smooth Surface Caries," 48th General Meeting of International Association of Dental Research, Published Abstract No. 466 (1970).

It is apparently not feasible to predict that a particular organism will effectively immunize against caries, merely by virtue of the fact that it is cariogenic in either gnotobiotic or normal animals to which it is administered. Thus, a particular organism may be cariogenic in gnotobiotic animals, but non-cariogenic in normal animals (cf., R. J. Fitzgerald, H. V. Jordan, and H. O. Archard, "Dental Caries in Gnotobiotic Rats Infected with a Variety of Lactobacillus Acidophilus," Archives of Oral Biology, Vol. 11, pp. 474–476 [1966]; and R. J. Fitzgerald and P. H. Keyes, "Demonstration of the Etiologic Role of Streptococci in Experimental Caries in the Hamster," Journal of American Dental Association, Vol. 61, pp. 9-19 [1960] ). Alternatively, an organism may be cariogenic in normal animals, or in both gnotobiotic and normal animals, and nevertheless ineffective as a vaccine (Tanzer, et al., and Guggenheim, et al., both cited, supra). Yet further, a particular organism which is non-cariogenic in gnotobiotic animals may be cariogenic in normal animals and yet ineffective as a vaccine (cf., Fitzgerald [1968] and Fitzgerald & Keyes [1962], both cited, supra).

The difficulty in predicting the immunizing effect of any specified organism against caries may be attributable to the fact that caries is not related to any one bacterium whose homologous effect in a vaccine may be predicted, but rather to a number of bacteria. Accordingly, for a particular organism to be effective as a vaccine against caries, it must have a heterogeneous immunizing effect.

It is, accordingly, among the objects of the present invention to provide a vaccine from a particular cariogenic microorganism, which vaccine is effective against heterogeneous bacteria as well as against the homologous organism, and which provides effective immunization against dental caries. Other objects and advantages of the invention will be apparent from the following detailed description of preferred embodiments thereof.

SUMMARY OF THE INVENTION

The present invention is based upon the discovery that the levan polysaccharide produced by Streptococcus Strain SS2 has powerful immunizing characteristics against the formation of dental caries. The invention is thus concerned with the use of a levan-producing Streptococcus microorganism for the preparation of a vaccine, and in immunization procedures therewith.

It is believed that the introduction of the levan material into the host causes the formation of antibodies against both the homologous Streptococcus organism and against other bacteria having an etiologic role in the formation of dental caries, and results in a decrease in the incidence of carious lesions as compared with those produced when levan is not utilized to effect immunization. The precise mechanism by which the antibodies immunize against caries is not fully understood. A significant improvement in the control of cariogenesis has, however, been noted employing the present invention, whatever the particular mechanism involved.

Streptococcus Strain SS2 has, in addition to *S. mutans*, previously been associated with the formation of dental caries. Strain SS2 was isolated by Gibbons and Banghart and described in Archives of Oral Biology, 1967, Vol. 12, pp. 11–24. This organism is widely available from many laboratories throughout the United States, especially the Forsyth Dental Center, Boston, Mass. The organism is easily isolated from the oral cavity, especially from dental caries, using conventional techniques.

*Streptococcus mutans* and Streptococcus Strain SS2 are organisms which are decidedly different from one another. One of these differences manifests itself in the physiological behavior of the organism in the presence of sucrose. *Streptococcus mutans* and Streptococcus Strain SS2 both produce sticky gum-like extracellular polysaccharides when cultured in the presence of sucrose. These polysaccharides are generally believed to be involved in the plaque formation by which carious lesions are initiated. The polysaccharide elaboration products of the two organisms in question are, however, quite distinct. Thus, *Streptococcus mutans* elaborates predominantly a dextran polysaccharide while Streptoccus Strain SS2 elaborates predominantly a levan polysaccharide material.

Of greatest present significance, however, is the fact that Streptococcus SS2 and the levan (polyfructan) polysaccharide produced thereby have been found to exhibit a heterologous immunizing effect against caries induced by *S. mutans*, as well as against caries induced by specific inoculation with the SS2 strain itself (see Example 1 below), whereas neither *S. mutans* nor its elaboration product display either an homologous or a heterologous immunizing effect against caries formed by the respective species of Streptococcus (see Controls A–E below). This distinct and surprising activity of the levan polysaccharide produced, for example, by the SS2 strain, forms the basis of the present invention.

PREFERRED EMBODIMENTS OF THE INVENTION

In accordance herewith, the levan-producing strain of Streptococcus, preferably Streptococcus Strain SS2, is cultured to permit the formation of extracellular levan polysaccharide. This is achieved by culturing the organism anaerobically in a nutrient medium containing sucrose for a sufficient time to allow extracellular accumulation of the leven polysaccharide, as described more fully below.

As a medium for culturing the microorganism, there is employed a medium containing sucrose as a carbon source. Other carbon sources are preferably kept at a minimum. The amount of sucrose present suitably ranges from 2 to 16, and preferably from 5 to 8, percent by weight based on the entire medium. The medium further contains a suitable source of nitrogen. For example, a natural nitrogen source such as peptone, malt extract, yeast extract, soy broth or the like may be present. Inorganic nitrogen sources such as ammonium sulfate, ammonium chloride, ammonium nitrate, etc., may also be used. In addition, inorganic salts incorporating cations such as magnesium, iron, sodium, potassium, manganese, zinc, calcium and the like, and anions such as sulfates, chlorides and nitrates, may be present in suitable amounts. Any other nutrient substances required for the growth of the Streptococci are employed as needed.

Culturing is carried out under anaerobic conditions using conventional methods. The culturing temperature is 35° to 38° C, preferably 37° C, and culturing pH is 6.8 to 7.4, preferably 7.0–7.2. Culturing time is usually 12 to 72 hours, preferably 24 to 48 hours, during which time a sufficient amount of extracellular levan polysaccharide is formed in the culture medium.

In preparing the vaccine of the present invention, the levan polysaccharide can be supplied in the form of the culturing liquor itself, preferably after removal of the cells, or dead cells can themselves be used. It is preferred, however, to isolate and recover the levan material in relatively pure form for use as the active component of the vaccine.

The levan polysaccharide may, for example, be recovered from the culturing medium by any manner known in the art. A particularly suitable method involves precipitating the levan from the cell-free mother liquors of the culture medium by adding an alkanol such as ethanol thereto. Usually from 1.5 to 2 volumes of ethanol is suitable. At this point it is desirable, though not necessary, to remove the low molecular weight fraction of the polysaccharide. This may be achieved by dialysis or by any other convenient method. In this regard, the levan normally has a molecular weight range of from 16 to 23 million with about 0.25 to 0.5 percent being in the lower molecular weight range of 2,000 to 5,000. It is this fraction which is desirably removed by dialysis.

The polysaccharide is thereafter preferably treated to remove therefrom any residual protein. This may also be achieved by any convenient method known in the art but it has been found especially suitable to use the method of Sevag, et al., Journal of Biological Chemistry, Vol. 124, pp. 425–435, 1938.

This method involves the use of chloroform and butanol or an alkanol such as isopropanol, hexanol or the like to dissolve the protein. The thus purified levan may then be reprecipitated with, for example, more ethanol, washed and dried. It is then ready and available for use in preparing the vaccine of the present invention.

The levan prepared in accordance with the preferred embodiment of this invention, viz., in accordance with which the lower molecular weight material is removed from the higher molecular weight material, and the higher molecular weight material is thereafter deproteinized, is eminently useful as a vaccinating material. While this material has not been characterized as to structural formula, it has been characterized as to its infra-red absorptivity and gross chemical composition. Characteristic peaks are 920 $cm^{-1}$, 875 $cm^{-1}$ and 805 $cm^{-1}$.

When the levan is hydrolyzed by acid, the hydrolyzate shows only fructose as a monomer by chromatographic analysis. In addition, the levan of the invention has the following physical characteristics:

| | |
|---|---|
| Intrinsic viscosity at 25° C | 0.15 to 0.16 |
| Rotation $[\alpha]_D^{20}$ | 43° to 54° |
| Total hexose | 98.4% |
| Protein nitrogen | less than 0.5% |

The vaccines of the present invention are liquid, preferably aqueous, solutions or emulsions containing from 0.1 to 1, and preferably 0.4 to 0.6, grams of levan per liter of liquid, the amounts of levan being given on the basis of the purified form. The liquid vehicle is preferably sterile saline, most preferably modified by adjuvants such as Freund's adjuvant or the like (in which case emulsions are obtained). Freund's adjuvant, when so employed, is suitably at a one to one level. As isotonic salts, the normal salts used in preparing saline solutions, e.g., sodium and potassium chlorides, may be utilized.

As noted hereinabove, the dead cells of Streptococcus SS2 may be utilized in place of the purified or unpurified levan in the vaccine of the present invention. Especially suitable are cells killed with formalin, that is, formalinized cells. Freund's adjuvant is also conveniently used irrespective of the particular source of levan. When dead cells are used, sufficient cells should be employed to provide the levan in an amount within the ranges referred to hereinabove. Typically, this will correspond to $0.5 \times 10^7$ to $4 \times 10^7$, preferably from $1 \times 10^7$ to $2 \times 10^7$, cells per milliliter of solution. Lower amounts may be employed when booster shots are administered following the first inoculation. Similarly, if unpurified levan is employed, the amount used should be sufficient to provide an effective amount of the pure material within the above ranges.

The vaccines of the invention may be administered by any technique normally employed, e.g., subcutaneously, intramuscularly, intravenously or the like. Dosage levels are suitably employed equivalent to 1 to 20 micrograms, preferably from 5 to 10 micrograms, of levan per kilogram of body weight. Booster shots may be administered from time to time as necessary.

The following examples are given to illustrate preferred embodiments of the present invention:

EXAMPLE 1

Immunization with Dead Streptococcus Strain SS2 Cells

| Group | No. | Cariogenic Diet | Antibiotic Suppression of Flora | Streptococcus Inoculation | Formalinized Strep. Cell Immunization |
|---|---|---|---|---|---|
| I | 10 | Mitchell | No | No | No |
| II | 10 | Mitchell | Yes | Yes | No |
| III | 10 | Mitchell | Yes | Yes | Yes |

Thirty newly weaned and littermated golden hamsters, derived from the colony of the National Institute of Health, were stratified into three balanced groups. In all cases, the animals received the Mitchell cariogenic diet and deionized water. Group I, the control group, received only the Mitchell diet.

The normal gram positive flora of the hamsters in Groups II and III were depressed at weaning by incorporating in the Mitchell diet 100 units of penicillin per gram thereof, for a period of four consecutive days. On the fifth day, the antibiotic was discontinued and the animals in Groups II and III were inoculated, in the cheek pouch area, with 0.1 milliliter of an 18-hour culture of a streptomycin-resistant mutant of the levan-forming Streptococcus Strain SS2. A streptomycin-resistant strain was utilized for experimental reasons only, i.e., to permit subsequent verification of the inoculation procedure by recovery of the organisms on Mitis Salivarius streptomycin agar.

The Streptococcus Strain SS2 used was obtained from Dr. R. J. Gibbons of Forsyth Dental Center, Boston, Mass. It is on deposit at the American Type Culture Collection, Rockville, Md., and bears the ATCC accession No. 27006. The organism was maintained on Trypticase Soy broth without dextrose (BBL), supplemented with 0.5 percent sucrose, at 37° C and a pH of 7.2. The sucrose was separately autoclaved and added aseptically to the medium. The organism was grown anaerobically in a BBL anaerobic jar in an atmosphere of 90 percent hydrogen and 10 percent carbon dioxide at 37° C.

On the day of inoculation, the animals in Group III were immunized by intraperitoneal injection with 0.5 milliliters of a vaccine comprising formalin-killed cells in complete Freund's adjuvant, in a 1:1 ratio. This injection was equivalent to the administration of $1 \times 10^7$ organisms. The vaccine for the immunization was prepared as follows: the organisms were allowed to grow anaerobically for 18 hours in Trypticase Soy broth containing 0.5 percent sucrose and 100 micrograms per millileter of streptomycin. The saline-washed cell-suspension was subjected to sonication in order to disrupt the molecular chains. The sonication, which was conducted prior to killing the cells, was effected by a Raytheon sonicator at 0.65 amps for 5 minutes. The suspension was thereafter adjusted with saline to give an optical density of 0.22 at 610 millimicrons (with a Bausch and Lomb colorimeter), and the cells were then suspended in 0.6 percent formalin overnight.

On the fifth day after commencing the cariogenic diet, each of the animals in the three test groups was anesthetized, its mouth being kept open with an eye speculum. Under a dissection microscope plaque material was collected aseptically with a sharpened probe, the plaque being obtained in most cases from the upper and lower third molars in 3 ml. of a thioglycolate broth. The plaque samples were thereafter sonicated for three minutes, and then placed in 0.01, 0.001, and 0.0001 dilutions in thioglycolate broth. 0.1 ml. of each of the diluted samples was plated on Mitis Salivarius agar, and the plates incubated anaerobically at 37°C in a 95% $N_2$ – 5% $CO_2$ atmosphere. The colonies thereby produced were classified in accordance with their morphological characteristics. All plaque samples contained *Streptococcus mutans*.

The animals were then used in a caries immunization experiment. The plaque samples taken from the animals of Groups II and III produced colonies on Mitis Salivarius streptomycin agar exhibiting the characteristics of the levan-forming SS2 strain. In addition, however, all of the plates (prepared by sampling of each of Groups I, II and III) incorporated colonies characteristic of *Streptococcus mutans*. Thus, it was concluded that the normal gram positive flora in the oral cavities of the hamsters included *S. mutans*, even after inoculation with the levan-forming test strain.

Four additional injections of the dead SS2 cell-containing vaccine were given at approximately 2-week intervals, the successive injections incorporating decreasing concentrations (from $1 \times 10^6$ to $2 \times 10^4$) of the formalinized organisms in the adjuvants. After a period of 12 weeks, the animals were sacrificed and saliva and serum samples were collected from each group for antibody titration. The antibodies from the serum and saliva were compared with a saline extract of Streptococcus Strain SS2 and levan obtained therefrom, the results indicating that an adequate antibody response was obtained in the serum and saliva of the immunized group of animals.

The animal heads were then defleshed by the well known method of Russell and scored for dental caries by a modified Keyes method. The second and third maxillary molars were utilized in the caries scoring procedure.

One animal from Group I, the control group, and two animals from Group II, died during the course of the study for reasons unrelated to the experimental procedures. The dental caries results for the remaining test animals are summarized below:

| Group | Mean Caries Scores | % Change |
|---|---|---|
| I | 26.89 | — |
| II | 37.66 | +40.05% (compared with Group I) |
| III | 12.18 | −67.66% (compared with Group II) |

From the preceding results it may be seen that the process of the invention is eminently effective in reducing the incidence of dental caries. Group II animals, inoculated with the cariogenic microorganism, were characterized by an increase of over 40 percent in incidence of caries over those of the control group (Group I) which received no cariogenic microorganism. As noted, both groups (as well as Group III) were on cariogenic diets.

The treated, immunized group (Group III), on the other hand, exhibited over 67 percent reduction in the incidence of dental caries as compared with Group II, thus demonstrating that the immunization procedure was extremely effective. From a statistical standpoint, the above results are significant to the 99 percent confidence level.

EXAMPLE 2

Preparation of Levan

Streptococcus Strain SS2 was grown anaerobically in Trypticase Soy broth without dextrose (Baltimore Biological Laboratories — BBL) supplemented with 8 percent sucrose for 48 hours in an atmosphere of 90 percent hydrogen and 10 percent carbon dioxide, while maintained at a temperature of 37° C and a pH of 7.2 The organisms were centrifuged off in a Sorvall refrigerated contrifuge equipped with an SS–34 head for 10 minutes at 10,000 rpm. The levan polysaccharide was precipitated from the supernatant by two and a half volumes of 95 percent ethanol.

The precipitated gum was redissolved in water and then repeatedly deproteinized by the addition of 0.25 volume of chloroform and 0.1 volume of amyl alcohol to the polysaccharide solution. The mixture was thereafter shaken for 15 minutes. The aqueous layer containing the levan polysaccharide was then dialyzed against distilled water for 24 hours in order to remove the low molecular weight fractions.

Levan polysaccharide from the aqueous layer was reprecipitated by the addition of ethanol and converted to a suspension of a fine powder. The thus purified levan was collected in a Buchner funnel on an acid-washed filter paper (Whatman 52), washed with absolute ethanol, acetone and petroleum ether and immediately transferred to a dessicator.

EXAMPLE 3

Immunization with Levan Per Se

The procedure of Example 1 was repeated with a further group of hamsters being immunized with 0.5 milliliter of a solution containing 500 grams of levan per milliliter of saline solution, in Freund's adjuvant in a 1:1 ratio. The levan so utilized was produced as set forth in Example 2 above.

Following the first inoculation with the levan vaccine, four additional injections were given separated by two-week intervals, respectively. The extent of dental caries produced in this group, as compared with test Groups I and II of Example 1, was then scored in the same manner as in the prior example. The dental caries score for Group IV was as follows:

| | Mean Caries Score | % Change |
|---|---|---|
| Group IV | 11.2 | −70% (compared with Group II) |

From the preceding it may be seen that there was a decrease of 70 percent in the incidence of caries in the Group IV animals immunized with pure levan as compared with the Group II animals of Example 1. This demonstrates a very effective immunization vaccine indeed. The above results are significant to the 99 percent confidence level from a statistical point of view.

Comparative Effect of Vaccination with *S. Mutans* on Caries Formation

Experiments similar to those described in Example 1 were carried out to compare the effect of vaccination with *S. mutans* rather than Streptococcus Strain SS2 on caries formation, after inoculation with *S. mutans* or Strain SS2, respectively.

In each experiment a group of nine test hamsters of the type utilized in Example 1 was placed on the Mitchell cariogenic diet and deionized water. Each of Control Groups A and B was inoculated with the levan-forming Streptococcus SS2 in the manner previously described, Control Group A only, being vaccinated with S. mutans strain 6715 (in the same formulations and dosages, and employing the same mode and frequency of administration specified in Example 1). Each of the animals of Control Groups C and D, on the other hand, was inoculated with the *S. mutans* strain itself, the hamsters of Control Group C also being vaccinated with formalinized dead cells of the same strain (again, employing the same method of administration described in Example 1).

The normal gram positive flora of each of Groups A-D was suppressed with penicillin in the manner previously described. The animals of Control Group E, on the other hand, were not administered antibiotics and were neither inoculated nor vaccinated with the respective Streptococcus organisms, although they were maintained on the same cariogenic diet utilized for each of the other test groups.

The results obtained in the experiments on the indicated control groups are set forth in the following tabulation:

| Control Group | Inoculation | Vaccination | Mean Caries Scores |
|---|---|---|---|
| A | Strep. SS2 | *S. mutans* strain 6715 | 20.80 |
| B | Strep. SS2 | saline placebo | 18.5 |
| C | *S. mutans* strain 6715 | formalinized *S. mutans* cells | 36.3 |
| D | *S. mutans* strain 6715 | saline placebo | 26.0 |
| E (Diet Control) | — | — | 5.2 |

From the preceding it may be seen that the *S. mutans* vaccines did not give protection against caries induced either by *S. mutans* itself or by Streptococcus Strain SS2, whether in the form of either live or dead cells. These results are to be contrasted with the decided decreases in caries scores obtained by vaccination with either the SS2 strain itself (Example 1) or the levan polysaccharide produced thereby (Example 3).

Comparative Effect of Enzyme Vaccines on Caries Formation

The enzymes dextransucrase and levansucrase are produced by *S. mutans* and Streptococcus Strain SS2, and are involved in the synthesis of dextran and levan by such organisms, respectively. These extracellular polysaccharides are believed to have a role in plaque formation and in the consequent development of caries. Accordingly, it was believed that immunization with dextransucrase or levansucrase might result in the production of antibodies to such enzymes which would neutralize their activity in vivo and thus inhibit synthesis of the polysaccharides and result in decreased plaque formation and lowered incidence of caries. As set forth hereinafter, however, experimentation has failed to confirm this hypothesis.

Five further groups of NIH golden hamsters were placed on the Mitchell cariogenic diet, and subjected to inoculation and immunization procedures similar to those described in Example 1. The gram positive flora of all of the test groups save one (Control F) were suppressed by treatment with penicillin as aforesaid. Two of the test groups (Controls G and H) were inoculated with an *S. mutans* organism (strain 6715), immunization of one of these groups (Group H) with dextransucrase concurrently being attempted. The two remaining groups of animals (Groups I and J) were inoculated with Streptococcus Strain SS2, Group J only being vaccinated with levansucrase. The dextransucrase and levansucrase enzymes utilized for immunization were employed in crude form, prepared by dialysis of the supernatant liquid from 18-hour cultures of the respective organisms grown on 8 percent sucrose broths.

After 9-week experimental periods, the test animals were sacrificed and their dental caries scored in the manner outlined hereinabove. The incidence of caries in the respective test groups was as follows:

| Control Group | Treatment | Mean Caries Scores | % Change |
| --- | --- | --- | --- |
| F (Diet Control) | None | 5.22 | — |
| G | Inoculation with *S. mutans*; no immunization | 26.00 | +398.4% (as compared with diet control) |
| H | Inoculation with *S. mutans* 6715; immunization with dextransucrase | 16.40 | −36.92% (as compared with Group G) |
| I | Inoculation with Strep. SS2; no immunization | 18.9 | +243.2% (as compared with diet control) |
| J | Inoculation with Strep. SS2; immunization with levansucrase | 14.02 | −22.92% (as compared with Group I) |

From the above it will be apparent that immunization with the crude dextransucrase vaccine resulted in a 37 percent reduction in the incidence of caries as compared with that displayed by the animals solely inoculated with the *S. mutans* strain, whereas those immunized with the levansucrase exhibited only a 23 percent decrease in carious lesions as compared with the group inoculated with the Streptococcus SS2 strain but not immunized. In the light of these results it was believed that greater reduction in cariogenesis could be obtained by immunization with dextransucrase of greater purity. For this purpose the following further experiments were carried out:

Four additional groups of the test animals were treated in the same manner as previously described, utilizing S. mutans 6715 for inoculation and purified dextransucrase for immunization. The enzyme thus utilized was purified as described by B. Guggenheim and E. Newburn in Hel. Odont. Acta., 13, pp. 8497 (1969). The caries scores were as follows:

| Control Group | Treatment[1] | Mean Caries Scores | % Change |
| --- | --- | --- | --- |
| K (Diet Control) | None | 21.95 | |
| L | Inoculation with *S. mutans* 6715; no immunization | 31.95 | +45% (as compared with diet control) |
| M | Inoculation with *S. mutans* 6715; immunization by intraperitoneal injection with purified dextransucrase | 29.58 | — |
| N | Inoculation with *S. mutans* 6715; immunization by injection of purified dextransucrase under the chin[2] | 28.8 | — |

[1] The normal gram positive flora of all test animals save for Control Group K were suppressed by treatment with penicillin in the manner described in Example 1.
[2] The animals in Control Group N were injected with the antigen under the chin in an effort to induce an accelerated immune response.

The foregoing results indicate that the purified dextransucrase was substantially ineffective in immunizing the test animals against caries formation, whether administered by either of the two routes utilized.

The preceding control experiments demonstrate that neither other organisms (S. mutans) nor enzymes (dextransucrase or levansucrase) believed to be involved in caries formation, possess the apparently unique characteristics of the levanpolysaccharide of the present invention for immunizing animal hosts against dental caries. It will be understood that various changes may be made in the preferred embodiments described hereinabove without departing from the scope of the present invention. Accordingly, the preceding should be construed as illustrative and not in a limiting sense.

What is claimed is:

1. A vaccine for immunization against dental caries, which comprises an aqueous, saline dispersion of from 0.1 to 1 gram per liter of a levan-polysaccharide elaboration product of a levan-producing strain of the genus Streptococcus, said levan-polysaccharide having a molecular weight fraction having characteristic infra-red absorption peaks at 920 cm.$^{-1}$, 875 cm.$^{-1}$ and 805 cm.$^{-1}$, an intrinsic viscosity at 25° C of from 0.15–0.16, and $[\alpha]_D^{20}$ rotation of 43° to 54°.

2. The vaccine of claim 1, wherein the levan-polysaccharide is dissolved therein in an amount of from 0.4 to 0.6 grams per liter thereof.

3. The vaccine of claim 1, wherein the strain of Streptococcus is Streptococcus Strain SS2.

4. The vaccine of claim 3, wherein the levan-polysaccharide is supplied in the form of dead Streptococcus Strain SS2 cells.

5. The vaccine of claim 3, wherein the levan-polysaccharide has a molecular weight range of 16 to 23 million.

6. A method for immunizing a host against the formation of dental caries, which comprises administering an effective amount of the vaccine of claim 1 to a host susceptible to dental caries.

7. The method of claim 6, wherein the amount of the levan-polysaccharide administered corresponds to between 1 and 20 micrograms of said polysaccharide per kilogram of host body weight.

8. The method of claim 6, wherein the amount of the levan-polysaccharide administered corresponds to between 5 and 10 micrograms of said polysaccharide per kilogram of host body weight.

9. The method of claim 6, wherein the levan-polysaccharide is an elaboration product of Streptococcus Strain SS2.

* * * * *